US006903484B1

(12) United States Patent
Kuhlmann-Wilsdorf

(10) Patent No.: US 6,903,484 B1
(45) Date of Patent: Jun. 7, 2005

(54) FLUIDIC PRESSURE HOLDER FOR ELECTRICAL METAL FIBER AND FOIL BRUSHES AND ANCILLARY CABLES

(75) Inventor: Doris Kuhlmann-Wilsdorf, 2600 Barracks Rd., Apt. No. 278, Charlottesville, VA (US) 22901

(73) Assignee: Doris Kuhlmann-Wilsdorf, Charlottesville, VA (US)

( * ) Notice: Subject to any disclaimer, the term of this patent is extended or adjusted under 35 U.S.C. 154(b) by 0 days.

(21) Appl. No.: 09/556,829

(22) Filed: Apr. 21, 2000

Related U.S. Application Data

(60) Provisional application No. 60/130,880, filed on Apr. 23, 1999.

(51) Int. Cl.[7] ........................ H01R 39/38; H01R 39/18; H02K 13/00; H02K 13/10

(52) U.S. Cl. ........................ 310/239; 310/243; 310/248; 310/249

(58) Field of Search ................................ 310/248–249, 310/239, 243

(56) References Cited

U.S. PATENT DOCUMENTS 2,477,708 A * 8/1949 McNab et al. .............. 310/228
2,503,021 A * 4/1950 Bennett ...................... 384/410
2,555,997 A * 6/1951 Porail ......................... 310/219
3,123,731 A * 3/1964 Gordon ...................... 310/243
3,148,295 A * 9/1964 Paxton et al. ............... 310/249
3,254,189 A * 5/1966 Evanicsko, Jr., et al. ... 200/264
3,821,024 A * 6/1974 Wilkin et al. ............... 428/634
4,027,184 A * 5/1977 Hurley ....................... 310/219
4,071,795 A * 1/1978 Dobbing et al. ............ 310/219
4,228,376 A * 10/1980 Mabuchi ..................... 310/242
4,241,273 A * 12/1980 Hatch ......................... 310/219
4,349,760 A * 9/1982 Diepers ....................... 310/248
4,355,709 A * 10/1982 Light ........................ 192/58 B
4,361,775 A * 11/1982 Diepers et al. ............. 310/248
4,409,505 A * 10/1983 Petersen ....................... 310/90
4,415,635 A * 11/1983 Wilsdorf et al. ............ 428/611
4,628,221 A * 12/1986 Young ......................... 310/178
4,767,957 A * 8/1988 Hatch .......................... 310/178
4,855,631 A * 8/1989 Sato et al. .................. 310/239
5,262,694 A * 11/1993 Frank .......................... 310/239
5,767,605 A * 6/1998 Giamati ....................... 310/239
6,326,716 B1 * 12/2001 Niimi et al. ................ 310/239
6,787,963 B2 * 9/2004 Tanaka et al. .............. 310/248
6,800,981 B2 * 10/2004 Kuhlmann-Wilsdorf .... 310/239

FOREIGN PATENT DOCUMENTS

GB 02-058479 A * 4/1981
JP 02-181313 * 7/1990

* cited by examiner

*Primary Examiner*—Darren Schuberg
*Assistant Examiner*—Pedro J. Cuevas
(74) *Attorney, Agent, or Firm*—Oblon, Spivak, McClelland, Maier & Neustadt, P.C.

(57) ABSTRACT

An electrical brush holder and ancillary cable for applying a mechanical force to an electrical brush and for establishing electrical contact between the electrical brush and a current conducting element. The brush holder includes a first wall fastened to the current conducting element, a second wall fastened to the brush, a sidewall lengthwise extendable in an axis direction of the brush and a flexible cable composed of ultra-fine metal fibers configured to conduct current between the current conducting element and the brush. The sidewall cooperates with the first and second walls to form a volume defined by the first wall, the second wall and the sidewall. A fluidic pressurized medium may be contained in the volume for applying a light approximately constant pressure to the brush.

22 Claims, 8 Drawing Sheets

FLUIDIC PRESSURE HOLDER FOR ELECTRICAL METAL FIBER AND FOIL BRUSHES AND ANCILLARY CABLES

CROSS-REFERENCES TO RELATED APPLICATIONS

This application claims priority to U.S. Provisional Application Ser. No. 60/130,880, filed Apr. 23, 1999, entitled "Liquid Metal/Compressed Gas Brush Holder." This application is also related to co-pending international application Ser. No. 09/147,100, filed on Apr. 4, 1997, entitled "Continuous Metal Fiber Brushes." The above-noted applications are herein incorporated by reference.

BACKGROUND OF THE INVENTION

1. Field of the Invention

This invention relates to electrical brush holders whose function is: (i) to maintain the running surface of any given brush to which it is releasably fastened in a steady, predetermined position during relative tangential motion between the brush and its substrate (i.e., commonly a slip ring or commutator), (ii) to apply a predetermined, approximately constant (compare the data in Table III) mechanical pressure between the brush running surface and the substrate while the brush may wear, and (iii) to conduct electrical current to or from the brush.

The electrical brushes at issue include all conventional "monolithic" brushes (i.e. made in one piece of graphite or graphite-metal mixtures), but are principally metal fiber brushes disclosed in U.S. Pat. Nos. 4,358,699 and 4,415,635, and in the co-pending international patent application Ser. No. 09/147,100 and foil brushes as described in the publication "Production and Performance of Metal Foil Brushes," P. B. Haney, D. Kuhlmann-Wilsdorf and H. G. F. Wilsdorf, WEAR, 73 (1981), pp. 261–282. The present invention is particularly useful for electrical metal fiber brushes in motors and generators when operating at high current densities, especially in homopolar motors/generators. The present invention includes the use of various technologies referenced and described in the above-noted U.S. Patents and Applications, as well as described in the references identified in the appended LIST OF REFERENCES and cross-referenced throughout the specification by reference to the corresponding number, in brackets, of the respective references listed in the LIST OF REFERENCES, the entire contents of which, including the related patents and applications listed above and the references listed in the LIST OF REFERENCES, are incorporated herein by reference.

2. Discussion of the Background

Sliding electrical contacts, i.e., "brushes," conduct electrical current between solids, very preponderantly metals, in relative motion. Brushes are in widespread use in various types of electric motors and generators and are also widely used in less common but numerous special applications, e.g. telemetry devices and rotating antennae. Even while to date the traditional "monolithic" (i.e., in the form of a solid piece) graphite-based (i.e., including compacted graphite or various metal-graphite mixtures) brushes are overwhelmingly frequent, they have a number of technological limitations. Specifically, monolithic graphite-based brushes cannot be reliably used over extended periods of time at current densities above about 30 Amp/Cm$^2$, nor at sliding speeds above about 25 m/sec. Further, as a coarse estimate, they waste about one watt per ampere conducted across the brush-substrate interface (i.e. the equivalent of one Volt) in terms of Joule and friction heat together. Further, monolithic brushes emit significant intensities of electromagnetic waves (i.e., they are electrically very noisy so as to interfere with radio and similar signal reception), and finally they wear into a powdery debris that can be highly detrimental in electrical machinery, especially aboard submarines.

As a result of these shortcomings of traditional monolithic brushes, a number of otherwise very attractive technological developments are stymied for lack of electrical brushes which will conduct reliably over extended time periods, much higher current densities at low losses up to much higher speeds. Most importantly impacted are so-called "homopolar" motors and generators. They have potentially very high power densities and would be excellent for Navy as well as commercial ship drives, among others, but typically require current densities in excess of one hundred Amperes per cm$^2$ to be conducted across interfaces of metal parts relatively moving at sustained speeds up to 30 m/sec or even more while producing or requiring EMF's of only 20V or so. The requirements of homopolar machinery in terms of current densities and speeds can thus not be fulfilled by monolithic brushes, and in any event a loss of 2 Volts per monolithic brush pair, i.e., in and out, is prohibitive for homopolar machines.

In previous inventions, particularly in the Patent Application "Continuous Metal Fiber Brushes, [1]" the capabilities of metal fiber brushes, including multitudes of essentially parallel hair-fine metal fibers, are outlined. Metal fiber brushes are intrinsically capable of easily conducting the desired current densities and to do so up to at least 70 m/sec with a total loss in the order of 0.1 Volt per brush. At the same time such brushes are electrically very quiet. These superior qualities derive from large numbers of separate electric "contact spots," namely at the fiber ends at the brush "working surface" sliding along the brush-substrate interface, through which the current is physically conducted on a microscopic scale. That the current is conducted across solid interfaces only through a restricted number of contact spots, whose total area amounts to only fractions of one percent of the macroscopic area of contact, is a well-known general physical phenomenon. To a large extent the poor qualities of monolithic brushes arise from their small number of contact spots, namely in the order of ten per brush. As a result, the current flow lines in monolithic brushes are not rather uniformly distributed, as they are in metal fiber brushes, but they are "constricted" [2] at the few contact spots. This causes the corresponding "constriction resistance" that represents in the order of one third the resistance of monolithic brushes. This constriction resistance is eliminated in metal fiber brushes on account of their large number of contact spots.

The superiority of metal fiber brushes does not only derive from their thousands of evenly distributed contact spots, but also because at their contact spots, bare metal meets bare metal, ideally separated only by a double monomolecular layer of adsorbed water. Fortuitously, this most favorable type of lubrication, which prevents cold-welding and accommodates the relative motion between brush and substrate at a "film resistivity" of only $\sigma_F \cong 1\times10^{-12}\ \Omega m^2$ and average friction coefficient ($\mu$) of about 0.3, establishes itself automatically at any modest ambient humidity, provided that the area of any one brush is not too large and there are gaps between the brushes so as to permit access of the moisture to the substrate and that undue contamination with oils, etc., is avoided. By contrast, monolithic brushes deposit a lubricating graphitic layer through which the current must flow at much higher electrical film resistivity and which typically is also overlaid by the already indicated film of adsorbed moisture [3]. Further, the body resistance of graphitic brushes can be significant while it is always negligible for metal fiber brushes. Finally, monolithic brushes are hard and "bounce." At increasing speeds, the "brush bounce" must be counteracted by an increasingly strong pressure between brush and substrate at the correspondingly increased friction power loss. This syndrome limits the sliding speed of monolithic brushes to about 25 m/sec, as already indicated, whereas metal fiber brushes are intrinsically flexible (i.e., have a much larger "mechanical compliance"). Therefore, metal fiber brushes can and should be mechanically lightly loaded and can be operated to high speeds with minor friction heat loss.

Metal foil brushes closely resemble metal fiber brushes except they are composed not of substantially parallel fibers but of thin parallel foils [4]. Consequently, metal foil brushes typically have many fewer, but otherwise the same kind of, contact spots. Thus, metal foil brushes are very similar to metal fiber brushes but cannot match their attainable current densities, sliding speeds and low power losses. At any rate, foil brushes are based on the same principle as metal fiber brushes, namely, electrical contact to the substrate at a large number of microscopically small, bare metal-metal contact spots, optimally lubricated by a double monomolecular layer of adsorbed water. Hence, in terms of the number of contact spots per unit working surface area (i.e., "contact spot density"), and mechanical load per contact spot, the same theory applies to metal foil as to metal fiber brushes [4].

As stressed, on account of their different geometry, foil brushes include a substantially smaller density of contact spots than well-constructed metal fiber brushes. By numerical example, the working surface of a typical metal fiber brush constructed of d=50 $\mu$m copper wires of about f=15% packing fraction contains roughly 10,000 contact spots per $cm^2$, namely, one at each of the individually flexible fiber ends. In a foil brush with $d_f$=25 $\mu$m thick parallel foils and f=50% packing fraction, there are about 600 contact spots per $cm^2$, located at the foil edges sliding on the substrate, with an estimated three contact spots per foil edge. Correspondingly, without suitable modifications of the substrate, foil brushes will be very superior to monolithic brushes, but fall short of metal fiber brushes [4].

In typical use, both types of brushes are expected to wear by similar length changes in the course of their life times, e.g. several millimeters (¼") or up to an inch, during which time the mechanical brush force should be kept roughly constant. The major differences between monolithic and metal fiber brushes include:

- lower mechanical pressure, namely several pounds per square inch for monolithic brushes, versus about 1 Newton per square centimeter≅1 pound per square inch for fiber brushes.
- higher current densities, i.e., up to 30 $Amp/cm^2$ 200 $Amp/in^2$ for monolithic brushes and up to 300 $Amp/cm^2$ 2000 $Amp/in^2$ for fiber brushes,
- at the indicated maximum tolerated current densities and speeds up to 70 m/sec, total losses of below 0.3V per ampere conducted, including friction and Joule heat, for fiber brushes and about 1 V/ampere conducted for monolithic brushes.

Correspondingly, the mechanical stiffness as well as the electrical resistance of, and hence the electrical loss in, the current leads to or from the brushes, are always inconsequential for monolithic brushes but become very important for metal fiber brushes when used anywhere near their current carrying capability.

As a result, the mechanical force can be applied to monolithic brushes via springs or any other desired mechanical means, while the current is led to or from the brushes either through the same springs and/or through ordinary flexible electrical cabling connected in parallel with the brush force applicator. However, this is not a viable option for demanding applications of metal fiber and foil brushes because 1) the weaker springs needed for them will unavoidably have an electrical resistance comparable to or higher than that of the brushes, unless they were to be cooled to cryogenic temperatures and even perhaps be made of a superconducting material, and 2) the incidental forces exerted on the brush by flexible cables with adequately low electrical resistance above cryogenic temperatures will rival or exceed the applied spring force.

The problem to be solved for metal fiber brushes used at high current densities above cryogenic temperatures is therefore how to apply a controllable light brush pressure and at the same time to establish a low resistance electric contact to or from the brushes. A system with these characteristics would in fact be applicable to any electrical brush, whether of metal fiber or monolithic type, under any running conditions, but it would be definitely necessary only for the indicated high-current-density use of metal fiber and foil brushes.

SUMMARY OF THE INVENTION

Accordingly, one object of the present invention is to solve the above-noted and other problems.

Another object of the present invention is to provide a novel brush holder, which operates via hydrostatic pressure of a compressed material, such as a compressed gas and/or liquid metal.

Yet another object of the present invention is to provide a novel brush holder, which eliminates or reduces "brush brounce."

Yet another object of the present invention is to provide a novel brush holder that can be used for a sequence of an indefinite number of brushes.

Still another object of the present invention is to provide a novel brush holder, which provides a light approximately constant pressure to a fiber or foil brush sliding against a substrate for extended periods of time.

Another object of the present invention is to provide a novel brush holder and ancillary cables, which has low electrical resistance to improve the current densities generated by the fiber or foil brush sliding against the substrate.

To achieve this and other objects, the present invention provides a novel electrical brush holder for applying a mechanical force to an electrical brush and for establishing electrical contact between the electrical brush and a current conducting element. The brush holder includes a first wall (herein also called "top wall") fastened to the current conducting element, a second wall (herein also called "bottom wall") that is releasably fastened to the brush via its base plate, and a sidewall lengthwise extendable in an axis direction of the brush. The sidewall cooperates with the first and second walls to form a volume defined by the first wall, the second wall and the sidewall. A fluidic medium is contained in the volume for applying a light approximately constant pressure to the brush. The present invention further provides a novel cable for conducting current at low resistance and low mechanical force between the current conducting element and the base plate of the brush.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
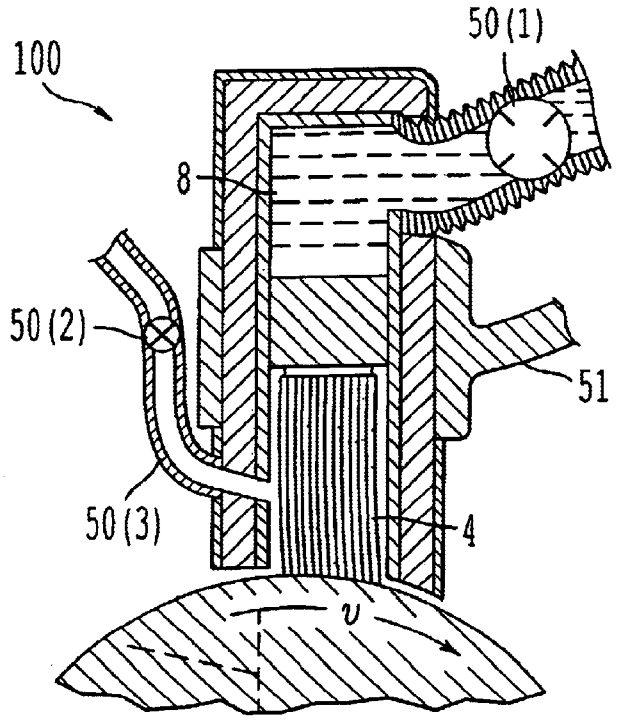
FIG. 1A shows a brush holder disclosed in co-pending international application Ser. No. 09/147,100.

DESCRIPTION OF THE PREFERRED EMBODIMENTS a) Relationships Between Electrical Resistance and Mechanical Stiffness for Combination Springs/Current Supplies or Cables Metal Springs for Simultaneous Brush Loading and Current Connection In future high-performance applications of metal fiber brushes, it is envisaged that currents of up to 2000 Amperes will be conducted through brushes of up to 1 square inch of working surface (e.g., a brush foot print on a slip ring), while the brush is pressed against the substrate (i.e., in this case a slip ring, with a brush pressure in the range of 1 Newton per square centimeter, i.e., roughly one pound per square inch). The brush pressure is intended to be maintained approximately constant, i.e. within a factor of two or three, even while the brush may slide at a high speed, up to more than 100 mph, and in course of time may shorten in length through wear by up to about one inch. Further, uncontrolled lateral motions of the brush other than its intended sliding, and in particular rotations of the brush axis during use are detrimental to brush wear. Therefore, such motions must be constrained within narrow limits. Finally, and most importantly, for high-performance applications, the sum of the friction loss and joule heat of the brush and its holder and current leads together, should not exceed 0.25 watt per ampere conducted, i.e. 0.25 Volt. These demanding conditions can be achieved with metal fiber or foil brushes, but not with currently available brush holders, at least not at "normal" (i.e., well above cryogenic or super-conducting) temperatures as prevail in almost all machinery. This is because ordinary cables of sufficient cross section to conduct the high currents at the required low losses are so stiff that they significantly if not disastrously interfere with the required uniform small brush forces that must be maintained over long periods of time even while the brushes shorten through wear.

The reverse, namely, the use of metal springs for both current leads and brush force applicators, also fails on account of electrical resistances that at best compare to, and at worst greatly exceed, the electrical brush resistance. This can be seen from the following example of a current connection/brush spring loading in the form of either a cantilever or spiral spring. This is an intrinsically very favorable method, but, independent of the problem of electrical resistance, must be combined with some mechanical constraint to prevent significant uncontrolled brush movements.

Specifically, the spring force, FL of a uniform cantilever of width w, length L and thickness t, made of a material with Young's modulus E, and the elastic deflection Δl of its free end is $$F_L=(Ewt^3/4L^3)\Delta l \quad (1).$$

The same equation, except with the factor ¼ being replaced by 4, holds for the deflection of the center of a doubly supported flat spring. However, since such springs involve two sliding contacts to the current supply, and since these will have an unknown, erratic resistance besides being prone to stick-slip, doubly supported flat springs are unlikely candidates for actual current conducting loading devices for electrical brushes. Lastly, for a spiral spring of $N_H$ turns of diameter D, made of wire with diameter d, it is, with the shear modulus G≈0.4E, $$F_H=(Gd^4/8N_HD^3)\Delta l \quad (2).$$

Next, the electrical resistance for current conduction through a cantilever spring is given by $$R_L=\rho L/wt \quad (3)$$

with ρ the electrical resistivity, and that through a helical spring of $N_H$ turns by $$R_H=\rho 4N_HD/d^2 \quad (4).$$

Thus, the force ($F_L$) and resistance ($R_L$) of a cantilever spring may be written as:

$$F_L=(Ew\Delta l/4)(\rho/wR_L)^3 \quad (5)$$

and $$R_L=\rho\{E\Delta l/4Fw^2\}^{1/3} \quad (6)$$

while for the helical spring:

$$R_H=\rho\{8N_H^2EAl/Fd^2\}^{1/3}\cong\rho\{3.2N_H^2EAl/Fd^2\}^{1/3} \quad (7).$$

Table I lists the approximate values for E(≅2.5G with G the shear modulus) and ρ, together with the resulting electrical resistances for a cantilever ($R_L$) and a helical spring ($R_H$) that would at the same time conduct the current to or from a brush and act as a spring to apply a desired brush force of F=1N=¼ lbs (characteristic for a 1×1 $cm^2$ cross-section fiber brush [7]). Herein the assumed dimensions are the best that were found for a practical case, namely w=1 cm (to permit fitting the cantilever spring to the brush), Al=1 cm (to permit 5 mm brush wear while the brush force decreases by 50%), d=0.1 cm for both the cantilever thickness and helical spring wire diameter, and $N_H$=3 turns of the spiral spring. Included among the candidate spring materials in Table I is TiNi, a widely used shape-memory alloy that might be considered for this application on account of its effective very low elastic modulus (E) near maximum recoverable strain. The assumed E value in Table I for the TiNi is at a tensile strain of ≅4% near the end of the plateau of its reported tensile stress curve, namely 160 MPa, and its ρ-value is that given by a manufacturer.

As seen, the resistances for a cantilever ($R_L$) and helical spring ($R_H$) are both too high relative to the optimal fiber brush resistance of ≅300 μΩ. Thus in high-performance metal fiber and foil brush applications, springs cannot simultaneously conduct all of the current and provide the brush force. Unfortunately, ordinary cables act like springs with similarly unfavorable combinations of spring force to electrical resistance, as discussed hereinafter.

TABLE I

| Material | E [N/cm$^2$] | ρ [μΩ cm] | $R_L$ [μΩ] | $R_H$ [μΩ] |
|---|---|---|---|---|
| Cu | 1.2 × $10^7$ | 1.6 | 230 | 5,200 |
| AgCu alloy | 1.2 × $10^7$ | 2 | 290 | 6,500 |
| stainless steel | 2 × $10^7$ | 70 | 12,000 | 270,000 |
| TiNi (shape memory) | 4 × $10^5$ | 70 | 3,200 | 73,000 |

The $R_H$ and $R_L$ data in Table I are to be compared with the electrical fiber brush resistance, $R_B$. According to theory [7, eq. 20.27], well supported by experimental evidence, it is for a 1 $cm^2$ brush area, $$R_B \cong 34[\mu\Omega cm^2]/f\beta^{2/3} \quad [8]$$

where f is the packing fraction and β is the local pressure at the contact spots in units of the impression hardness of the softer side. With β typically between ⅓ and ½ and f optimally equal to 0.2, $R_B$≈300 μΩ. Correspondingly, the resistances of all loading springs in the table at best compare to, or else are much larger than, the brush resistance, and hence are unsuitable for high-performance applications.

In Table I, the spring geometries are near optimum, with the cantilever spring very superior to the helical spring, and also to any doubly supported flat spring on account of the already mentioned additional contact resistances. Among the materials choices, the best are copper and copper-silver alloy, while the shape memory alloy suffers from the fundamental disadvantage of a high resistivity, and it would still be unsuitable even at drastically lowered resistivity. Moreover, the spring designs are limited by the maximum allowable elastic strain before permanent deformation or fracture. Thus, whenever the relatively high Joule heat evolution is acceptable, one will from case to case have to devise suitable spring constructions to not exceed the strength of the spring material. In this instance, copper-silver alloys have a considerable advantage. Such alloys have been developed for a combination of maximum strength and electrical conductivity for use in the windings of large electromagnets. Considering the very substantial research effort that has been expended in their development, it is unlikely that still superior fiber brush spring materials exist.

In summary, for truly high-performance metal fiber and foil brush tasks, metal springs will not be satisfactory at ambient temperatures in a dual role of current lead and force applicator. Matters are quite different, however, at cryogenic temperatures at which metal resistivities are drastically lowered, or may even vanish in the superconducting state. At those temperatures, springs in a dual role of current leads and load applicators could be highly successful. Albeit, at any temperature or any level of Joule heat evolution, springs for brush applicators cannot be used alone since they will permit too large uncontrolled lateral brush movements. These must be independently constrained, e.g., most simply by rigid tubing to guide a brush in its axial direction as it wears.

Unintended Forces Due to Electrical Cables for Brush Current Connections a) General Considerations The above considerations imply that at least at ambient temperatures and above, metal cabling will exert uncontrolled forces on brushes, independent of the means of brush force application, that will be unacceptably high for high-performance conditions such as in planned future homopolar motors. This problem may be assessed by modeling the mechanical stiffness of a single wire or fiber in a cable as a cantilever. Accordingly, adapting eq. 1 for the spring force, FL, of a uniform cantilever of solid cross section of $A_L$=wxt, made of a material with Young's modulus E, as a function of the deflection Al of its free end, to a cylindrical wire of diameter d=t=w, i.e cross section $A_S$≅$d^2$, one obtains for the single strand in a cable:

$$F_S \cong (EA_S\, d^2/4L^3)Al \quad (9)$$

Hence, disregarding friction among the strands, for a cable of $N_C$ strands, and thus material cross-sectional area $A_C$=$N_C$ $A_S$, the spring force at deflection Δl is at a minimum (i.e. disregarding friction among the strands in the cable which is liable to be significant), $$F_C N_C\, F_S \cong (EA_C\, d^2/4L^3)Al \quad (10)$$

while the cable's electrical resistance from end to end is $$R_C = \rho L/N_C d^2 \cong \rho L/A_C \quad (11)$$

As a numerical example consider the same 1 $cm^2$ metal fiber brush with an approximate $R_B$=300 μΩ resistance. For the commonly used copper cables with ρ=1.6 μΩcm and cable length L=3 cm (for a hypothetical initial brush length of 1.5 cm), the desired relatively negligible cable resistance of $R_C$=50 μΩ requires, according to eq. 11, $A_C \cong N_C d^2 \cong 0.1$ $cm^2$. If, again, travel of Al=0.5 cm in the course of brush wear is desired, eq. 10, with E=1.2×$10^7$ N/$cm^2$, yields for the cable force $$F_C \cong 5600 \times d^2 \text{ [N]} \quad (12)$$

with, d measured in cm. With the typical fiber diameter of d=0.015 cm in ordinary flexible electrical cable, the force due to the cable would thus be $F_C$=1.2 N and, hence, unacceptably large.

b) Electric Cables Composed of Ultra-Fine Metal Fibers

In line with the above considerations, cabling to lead electrical current to or from electrical brushes with minimal electrical resistance at minimal mechanical forces is possible by the use of ultra-fine fibers. This is demonstrated in the following TABLE II for the same cable of $A_C$=0.1 $cm^2$ materials cross-section and $N_C$ approximate number of strands, examined above, for the cases of fiber diameters d below 101 $\mu$m, 51 $\mu$m, 41 $\mu$m, 21 $\mu$m, 11 $\mu$m and down to 2 $\mu$m. The latter is the smallest likely fiber diameter because it can still be somewhat inexpensively obtained through etching from commercial multi-filamentary cables, and will not exhibit significantly increased resistivity on account of short free conduction electron paths. Thus, TABLE II indicates the approximate number of strands ($N_C$) in a copper cable of $A_C$=0.1 cm$^2$ solid cross sectional area composed of $N_C$ individual strands of diameter d, and the approximate minimum force $F_C$ (i.e. minus the force due to friction among the strands in the cable) exerted between the two ends of that cable if they were displaced by Al=0.5 cm relative to each other. The cable resistance would be $R_C$=50 $\mu\Omega$.

TABLE II

| d | $N_C$ | $F_C$ [N] |
|---|---|---|
| 100 $\mu$m | 1000 | 0.56 |
| 50 $\mu$m | 4000 | 0.14 |
| 40 $\mu$m | 6200 | 0.09 |
| 20 $\mu$m | 25,000 | 0.022 |
| 10 $\mu$m | 100,000 | 0.0056 |
| 2 $\mu$m | $2.5 \times 10^6$ | 0.00022 |

The data in Table II indicates that at sufficiently fine fiber diameters, electrical cables of standard types of construction can be made flexible enough for leading current to and from metal fiber brushes at ambient temperatures even under the most demanding circumstances. However, in order to keep the friction forces among the individual strands low, the packing fraction of the solid material in the cables should be small, e.g. $\frac{1}{3}^{rd}$, so the contemplated $A_C$ =0.1 cm$^2$ cables would have a macroscopic diameter of about 0.3 cm$^2$, i.e. about 5 mm diameter. This would seem still feasible for cabling to a 1 cm$^2$ brush but will approach the practical limit. A further advantage of such cabling will be the opportunity to fit electrical connectors to its ends, or to branch or even fit it with electrical outlets.

In summary, electrical cables meeting the highest demands of metal fiber brushes can be made of fibers of less than 51 $\mu$m diameter, with diameters below 41 $\mu$m and 11 $\mu$m increasingly satisfactory, and d=2 $\mu$m presumably a practical lower limit. Such cables can be used to supplement current conduction to and from brushes by other means, e.g. via loading springs as discussed in the above section, or provide the sole current path in case, for example, a compressed gas is employed to provide the mechanical brush force.

c) Electric Cables Filled with Liquid Metal

The desired electrical cabling for conducting current to and from brushes at very low electrical resistance and transmitting low mechanical forces can also be constructed of liquid metal confined in flexible tubing (e.g. such as connecting shower heads to a water supply), or perhaps more simply in flexible plastic tubing. Such cabling will have the same advantage as solid metal cabling constructed of ultra-fine fibers, namely that it can be readily branched or fitted with connectors and current outlets. Albeit, for the same electrical resistance per length of cable, the conducting material cross-section must be proportional to the ratio of the resistivities concerned, i.e., for a liquid metal with a ten times larger electrical resistivity (which is a reasonable or perhaps conservative estimate), the cross-section of the conducting area must be ten times larger than for the solid metal. Accordingly, since in the order of only $\frac{1}{3}^{rd}$ of the solid metal cabling will typically be occupied by the fibers, the actual cross-section of the liquid metal cable exclusive of its tubing would be 10/3 that of the solid cable, and the cable radius $(10/3)^{1/2}$=1.8 times larger than for the solid cable. Accordingly, liquid metal cabling will typically be fairly massive in size. Such liquid metal cabling can be even more easily fitted with electrical connectors and can be made to branch or to be fitted with electrical "plugs" than solid cabling made of ultra-fine fibers.

d) Brush Holders Activated by Hydrostatic Fluid Pressure

Every brush holder/brush loading device, whether for monolithic carbon-based or for metal fiber or foil brushes, must fulfill three independent functions:

1. It must guide the brush along its axial direction as it wears and prevent vibrations that would seriously degrade brush wear life.
2. As the brush wears, it must apply an approximately constant force to maintain an approximately constant pressure between the brush face and the substrate even while the brush may wear through significant lengths.
3. It must feed the brush currents to or from the brush without interfering with brush loading.

The first function is basically the same for conventional as well as for metal fiber brushes and can be fulfilled by any low-friction guiding device (e.g. a tubing within which the brush is pushed forward). The second function is typically fulfilled by springs of various designs, including constant force springs. At any brush current, the only applicable consideration in back-fitting here is the considerably lower brush force that is required for fiber brushes. The third function is conventionally accomplished by means of flexible cables (or "pig tails"). Pig tails are always acceptable for monolithic brushes since these are never subjected to high current densities (i.e., do not require large solid cross sectional areas for connecting cables), and the mechanical brush force required for them is much higher than for fiber brushes. Pig tails also pose no problem for metal fiber brushes at low to moderate current densities, which explains why retrofitting of fiber brushes is generally possible unless current densities are high. However, as already discussed, at high brush current densities, conventional pig tails, as well as any conventional cables to bypass the loading feature, either are too stiff and interfere with the second function or they have a too high electrical resistance and as a result interfere with the critical advantage of fiber brushes, namely of permitting high current densities at low Joule and friction losses.

In the co-pending International patent application S/N 09/147,100, a brush holder has been disclosed in which both current conduction and brush force application occurs through a hydrostatically compressed liquid metal that is fed from a central reservoir which may supply two or more similar brush holders (see FIG. 1A). The present invention concerns brush holders in which the brush force is derived from a hydrostatically compressed fluid other than a liquid metal connected to a liquid metal reservoir The fluid may comprise a liquid metal and a gas in pressure-transmitting contact therewith via a flexible membrane between them, or a gas alone. In the latter case, the requisite low-resistance current connection between the brush and the stator or other current-conducting element is made via a metal cable of ultra-fine fibers or via a liquid metal cable or both. The compressed gas together with the liquid metal may be wholly confined within a cavity in the brush holder, or the gas may be connected to a pressurized gas reservoir via a flexible tubing. Further, the brush force may be supplemented by a mechanical spring or by the reactive force of a cable used for current conduction.

If the pressurized fluid has no connection to the outside, the pressure and with it the brush force will inevitably drop with brush wear. Specifically, consider a simple, closed cylindrical internal volume $$V=Ah \quad (13)$$

of the brush holder (i.e., of cross-sectional area A and momentary height h) relative to a standard (not necessarily the initial) height $h_o$. If the volumes of metal and gas are $$V_M=mAh_o \text{ and } V_G=Ah-mAh_0 \quad (14)$$

respectively, then the internal pressure in the holder is $$p_G=p_{Go}\,V_{Go}/V_G=p_{Go}(Ah-Amh_o)/(Ah-AMh_o)=p_{Go}[(1-m)/h/h_o-m)] \quad (15)$$

yielding a brush pressure of $$p_B=P_G\,A/A_B=p_{Go}(A/A_B)[(1-m)/(h/h_o-m)] \quad (16).$$

In Table III, $\rho_B$ has been calculated for $A=A_B$, $h_0=0.4$ cm, $\rho_B=\beta 3$ [N/cm$^2$] (where, β is the brush pressure in units the maximum pressure at which the average contact spot is still elastic, see [7]), m=0.3 and $\rho_{Go}=3.64$ [N/cm$^2$]. In order to keep the brush pressure within reasonable limits, however, β must remain within the limits of 0.7 and 0.25. TABLE III indicates the dependence of brush pressure on wear length by the use of a brush holder of initial height h of 0.6 cm partly filled with liquid metal and partly with gas at the indicated pressures. At h=0.4 cm, the metal would occupy m=30% of the interior holder volume. A total wear length of 9 mm is possible between β=0.7 and 0.25. Below β=0.25 arcing is likely.

TABLE III

| h [cm] | $h/h_o$ | $p_B$ [N/cm$^2$] | β | Brush Pressure | Wear Length [cm] |
|---|---|---|---|---|---|
| 0.4 | 1.0 | 3.64 | 1.21 | too high | before start |
| 0.45 | 1.125 | 3.09 | 1.03 | too high | before start |
| 0.5 | 1.25 | 2.68 | 0.89 | too high | before start |
| 0.6 | 1.5 | 2.12 | 0.707 | OK | start: 0.0 |
| 0.7 | 1.75 | 1.75 | 0.586 | OK | 0.1 |
| 0.8 | 2.0 | 1.50 | 0.50 | OK | 0.2 |
| 0.9 | 2.25 | 1.31 | 0.436 | OK | 0.3 |
| 1.0 | 2.5 | 1.16 | 0.386 | OK | 0.4 |
| 1.1 | 2.75 | 1.04 | 0.347 | OK | 0.5 |
| 1.2 | 3.0 | 0.944 | 0.315 | OK | 0.7 |
| 1.5 | 3.75 | 0.739 | 0.246 | barely OK | 0.9 |
| 1.75 | 4.38 | 0.582 | 0.194 | too low | too low |
| 2.0 | 5.0 | 0.542 | 0.181 | too low | too low |

One difficulty with the above design would be a relatively high electrical resistance since the liquid metal cross section through which the current must flow, is on average only about 10% of the brush area but it is also only about 1 cm long. The advantage of this design is that it is self-contained and maintenance free, could be made cheaply, and could form an integral part of brushes to be discarded with them at the end of their life.

Alternatively, the liquid metal could be replaced by a cable made of ultra-thin fibers in accordance with section (b) discussed previously. If self-contained, the pressure would drop a little slower than in the table above, and if the gas is connected to a compressed gas reservoir, the brush force would remain constant. In the first case the obtainable wear length would be mildly increased, and in the second case it would be almost indefinite.

The various embodiments of the invention differ in any one, or a combination of any of, the following:

(i) In the means by which the brush holder, at its first (i.e top) wall, is connected to the current-conducting element, among others through screws, by soldering, a dove tail, a bayonet closure, cementing or gluing (in case the electrical connection to the base plate of the brush is made through cabling);

(ii) Whether or not the gas is wholly confined within the brush holder cavity or is pressurized from an exterior reservoir;

(iii) In the means by which the brush is fastened via its base wall, to the second (i.e. bottom) plate of the brush holder, among others by the same means as in (i);

(iv) In the construction of the side wall that confines the compressed fluid and is extendable in the brush axis direction so as to permit the brush to advance as it wears. The modifications of the side wall include, among others, bellows, telescoping tubing, flexible plastic material, spiral tubing similar to a clothes dryer exhaust hose;

(v) In the arrangement of the gas and liquid volumes when both are used;

(vi) In the means for providing restraints to minimize uncontrolled brush movements other than its sliding relative to the substrate and its advance in the course of brush wear, among others though rigid prismatic tubing within which the second wall or the brush base plate is guided, or through rods that are parallel to the brush axis direction and one end of which is fixed to the first (i.e. top) wall and to the second (i.e. bottom) wall or the brush base plate, respectively;

(vii) In the number of simultaneously operated brushes;

(viii) In the shape of the first and/or second walls, e.g. angled in conformity with the intended brush orientation relative to the current-conducting element, e.g., the stator, and the substrate;

(ix) Whether and in which manner the brush force due to the pressurized fluid is supplemented by mechanical means.

(x) Whether and in which manner the electrical conduction between the current conducting element and the base plate of the brush is supplemented by electrical cabling.

Turning now to the drawings, wherein like reference labels designate identical or corresponding parts throughout the several views, FIG. 1A is a schematic cross-sectional view, including a variety of useful optional features, of the brush holder 100 disclosed in co-pending International application Ser. No. 09/147,100. The brush pressure is applied and the current is fed from the brush 4 by a liquid metal 8 in communion with a pressurized liquid metal reservoir (not shown), so that the liquid metal 8 is used for both brush force application and a low-resistance current path. Valves 50(1), 50(2) and 50(3) permit adjustments of the fluid pressure and mechanical linkage 51 permits positioning of the brush holder.

e) Details of the Drawings

Turning now to the drawings, wherein like reference labels designate identical or corresponding parts throughout the several views, FIG. 1A is a schematic cross-sectional view, including a variety of useful optional features, of the brush holder 100 disclosed in co-pending International application Ser. No. 09/147,100. The brush pressure is applied and the current is fed from the brush 4 by a liquid metal 8 in communion with a pressurized liquid metal reservoir (not shown), so that the liquid metal 8 is used for both brush force application and a low-resistance current path.

Figure 2A:
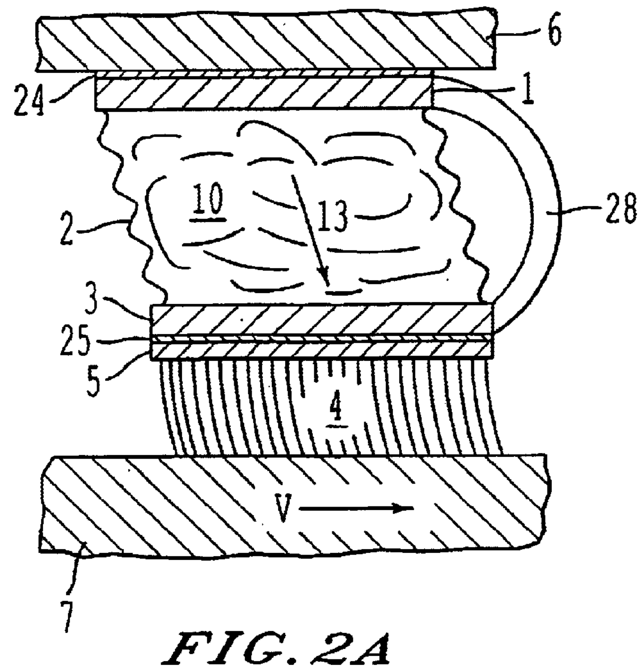
FIGS. 2A to 2C are schematic cross-sectional views of the brush holder according to the present invention with one brush (FIG. 2A) and two brushes (FIG. 2B) attached to one second (i.e. bottom) plate, and with two brushes attached to two second (i.e. bottom) plates (FIG. 2C)
Figure 2B:
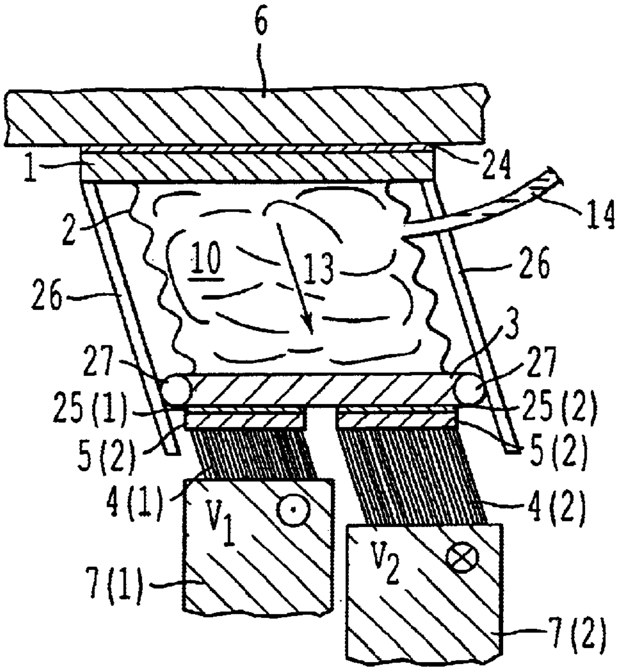
Figure 2C:
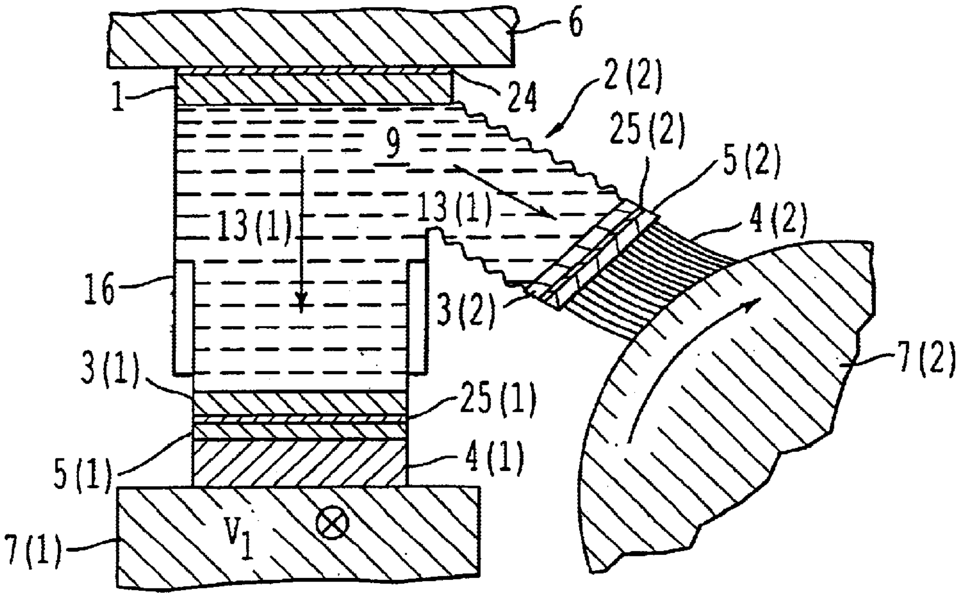

FIGS. 2A to 2C are schematic cross-sectional views of the brush holder according to the present invention with one brush 4 in FIG. 2A, and with two brushes 4(1) and 4(2) in FIGS. 2B and 2C. The brush base plates 5, 5(1) and 5(2) are releasably attached (25, 25(1) and 25(2)) to a single second (i.e. bottom) wall 3 in FIGS. 2A and 2B, and to two independent second walls 3(1) and 3(2) in FIG. 2C. Brushes 4, 4(1) and 4(2) slide on substrates 7, 7(1) and 7(2), respectively. FIG. 2A also includes a flexible cable 28 made of ultra-fine metal fibers to provide a low-resistance current path between the current conducting element 6 and the base plate of the brush 5.

In more detail, FIG. 2A depicts the brush 4 pressed against a substrate 7 (typically a slip ring or a commutator) in an axis direction 13 of the electrical brush by means of a compressed gas 10 confined between a first wall 1, a second wall 3 and a side wall 2 that is extendable in brush axis direction 13. The bottom wall 3 is releasably attached to the brush 4 via conductive releasable fastening mechanism 25. The top wall 1 is connected to current conducting element 6 via an electrically conductive fastener mechanism 24. The fastening mechanism 24 may be any fastener or combination of fasteners that permits a current to pass and secures the conducting element 6 to the first wall 1, such as screws, solder bayonet closure, dove tail, etc. optionally supplemented by cement, glue, etc. The fastening mechanism 24 should be strong enough to keep the conducting element secured to the first wall 1 during lengthy periods of operation, etc. Current which is conducted through brush 4 sliding against substrate 7 reaches the current conducting element 6 via brush base plate 5, electrically conductive releasable fastener mechanism 25, second plate 3, cable 28 and first wall 1.

For clarity, FIG. 2B does not show the electrical cable that will be needed if, as indicated, again the brush pressure is applied through compressed gas 10. Depending on demands on total electrical resistance between the conducting element 6 and substrates 7(1) and 7(2) such a cable may not be needed if compressed liquid metal is used instead. Most importantly, FIG. 2B differs from FIG. 2A in illustrating the use of two brushes 4(1) and 4(2) sliding on two different substrates 7(1) and 7(2), which in this case are shown as moving in opposite directions but could move in any arbitrary relative orientation. Also shown in FIG. 2B are the two brush base plates 5(1) and 5(2) for each of the brushes 4(1) and 4(2) that are attached to the bottom wall 3 via releasable, conductive fastening mechanisms 25(1) and 25(2). Those latter mechanisms are similar to fastening mechanism 24 and can comprise any fastener or combination of fasteners sufficiently strong to reliably secure the brush base plates 5(1) and 5(2) to the second wall 3 such that current can readily flow between the base plates and second plates. As in FIG. 2A, the side wall in FIG. 2B is compressible in the direction of the brush axes 13 such as bellows. Since this implies low rigidity normal to axis direction 13, FIG. 2B also includes a rigid tubing 26 to restrict the movements of the side wall 2, and thus restrict unwanted lateral movements of the brushes 4(1) and 4(2). Also shown are guides 27 between the bottom wall 3 and the rigid tubing 26 to guide the brushes 4(1) and 4(2). That is, the guides 27 prevent the brush holder from moving around within the rigid tubing 26 so as to prevent unwanted lateral movements of the brushes, and thus guide the brushes 4 downwards as they wear. Also shown in FIG. 2B is a flexible hose 14 for pressurizing a gas 10 from outside of the brush holder. That is, using the flexible hose 14, the pressure of the gas 10 within the side wall 2 and first wall 1 and second wall 3, may be increased or decreased independent of brush wear and thus can maintain constant force. As already indicated, the brush pressure is in an axis direction 13 of the electrical brushes 4(1) and 4(2).

FIG. 2C also illustrates a brush holder for holding two brushes 4(1) and 4(2) respectively against substrates 7(1) and 7(2). In this figure, there are two second (i.e. bottom) walls 3(1) and 3(2) for the brushes 4(1) and 4(2). This is different than FIG. 2B, in which there is only one bottom plate 3. The brushes 4(1) and 4(2) are pressed against the substrates 7(1) and 7(2) along their respective brush axes 13(1) and 13(2) via a compressed fluid 9 that could be a liquid metal, a some gas, and again a cable or other current conducting means (not shown) would have to be used in case the compressed fluid 9 in FIG. 2C were non-conducting. Also shown is a telescoping side wall 16, which is sealed against fluid leakage and lengthens or shortens depending on the brush wear. In addition, by electrically disconnecting the holder from the current-conducting element (6), the arrangements in both FIGS. 2B and 2C may be adapted to lead a current between the two different substrates 7(1) and 7(2), instead of between the current-conducting element 6 and the two substrates.

Figure 3A:
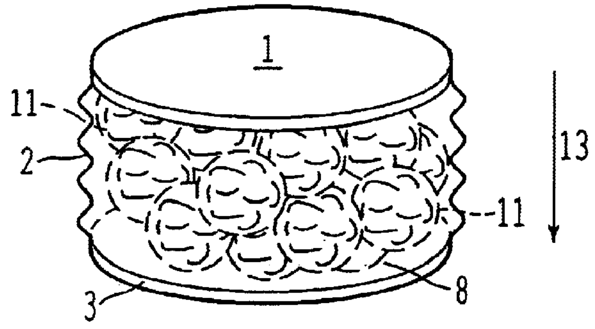
FIGS. 3A and 3B are perspective views of FIG. 2A in which a pressurized material includes both a liquid metal and a compressed gas.
Figure 3B:
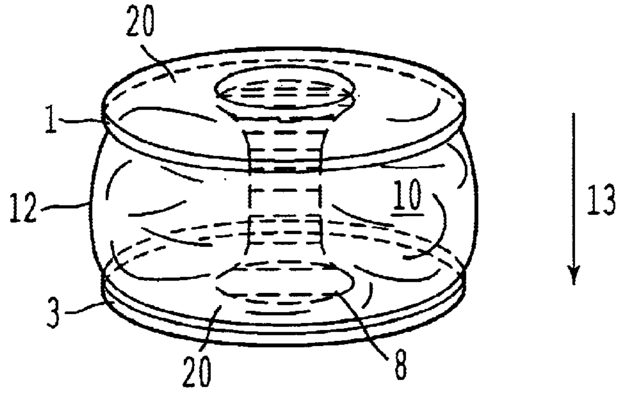
Figure 3C:
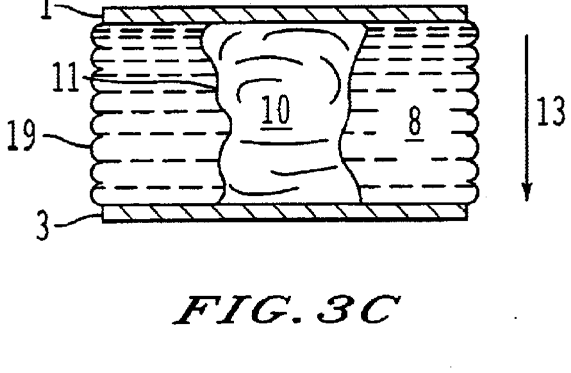
FIG. 3C is a cross-sectional view of the brush holder in FIGS. 3A and 3B, but with a different configuration for the compressed gas and an outer wall strengthened by spiral tubing.

FIGS. 3A to 3C show examples of different arrangements in which the brush pressure may be applied by a liquid metal in pressure-transmitting contact with a compressed gas via flexible membranes 11. In FIG. 3A, the pressurized gas 10 is confined in small spherical volumes like little balloons (i.e., flexible membranes 11) that are surrounded by a liquid metal 9. The first wall 1, side walls 2 and second wall 3 confine the flexible membranes 11 and liquid metal 8.

FIG. 3B illustrates a toroidal flexible membrane 12, much like an inner tube of a car tire, filled with a compressed gas 10. The liquid metal 8 surrounds and occupies a portion in the center of the configuration (i.e., in the middle of the membrane 12). The toroidal flexible membrane 12 is secured between the top wall 1 and bottom wall 2 at attachment areas 20.

FIG. 3C illustrates the flexible membrane 11 with the compressed gas 10 surrounded by the liquid metal 8 (rather than the compressed gas 10 surrounding the liquid metal 8 as in FIG. 3B). The liquid metal 8 and flexible membrane 11 (with the compressed gas 10) is contained via the top wall 1, bottom wall 3 and spiral side walls 19. The spiral side walls 19 are composed of spiral tubing, such as that for a clothes dryer's exhaust.

Figure 3D:
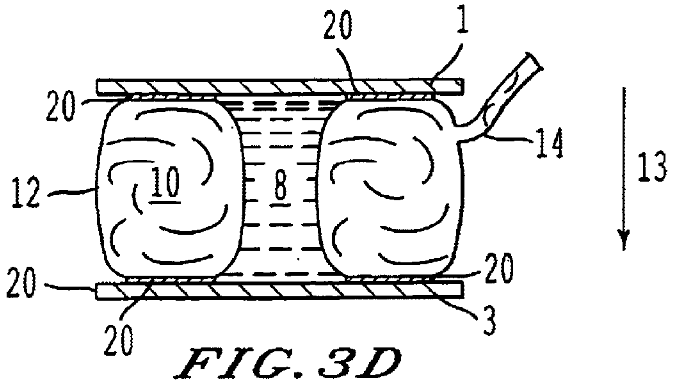
FIG. 3D is a cross-sectional view of the brush holder of FIG. 3B including a flexible connection to a pressurized gas reservoir to maintain a gas pressure.

Comparing FIG. 3D with FIG. 3B illustrates the possibility that the compressed gas 10 may be pressurized from an outside via a flexible hose 14 as in FIG. 2B. That is, as shown in FIG. 3D, the pressure of the gas 10 may be controlled via the flexible hose 14 connected to an external reservoir. Thus, it is possible to maintain a constant brush force via the flexible hose 14. On the contrary, if the gas is entirely confined within the inner volume of the brush holder defined by the first wall 1, second wall 3 and side walls 2, 19 as in FIGS. 3A, 3B and 3C, the pressure and hence the brush force, drops as the brush wears and the indicated inner volume of the brush holder increases.

Each of the side walls shown in the above figures are lengthwise extendable in the brush axis direction 13 and should be configured to prevent uncontrolled lateral brush motions that are detrimental to the performance of the brush. For example, depending on particular conditions, the toroidal flexible membrane 12 in FIGS. 3B and 3D and the spiral tubing 19 in FIG. 3C should be laterally adequately stiff to prevent erratic lateral brush movements. It is also possible to further constrain erratic lateral brush movements by using the telescoping tubing shown in FIGS. 4A–4B (and FIG. 2C).

Figure 4A:
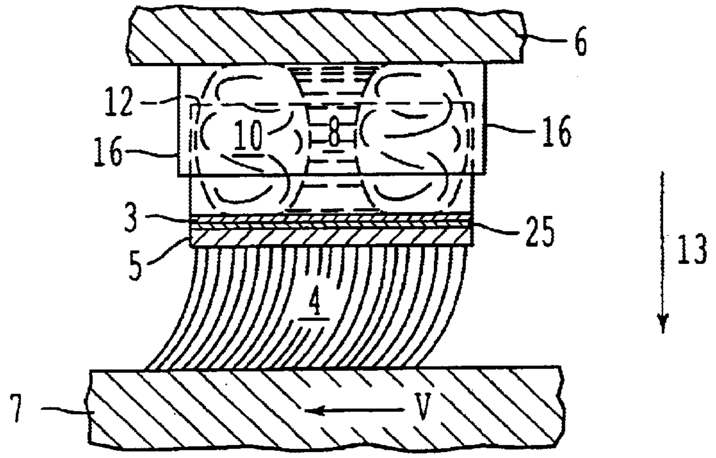
FIGS. 4A and 4B are cross-sectional views of the brush holder in FIGS. 3B and 3D, but include a telescoping outer wall showing a at the start position of a brush operation (FIG. 4A) and after significant brush wear (FIG. 4B)
Figure 4B:
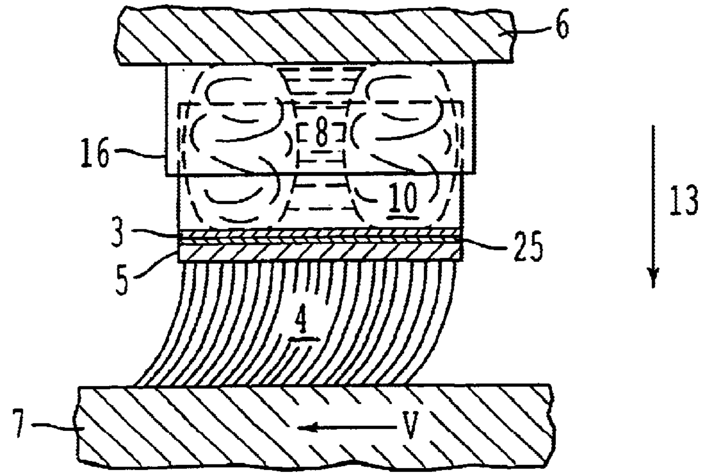

For example, as shown in FIG. 4A, the toroidal flexible membrane 12 having the compressed gas 10 therein is constrained from expanding outwards via the telescoping side wall 16. The telescoping side wall 16 provides sufficient support for the toroidal flexible membrane 12 so as to prevent erratic lateral brush movements. FIG. 4B is similar to FIG. 4A, but shows the telescoping side wall after the brush 4 has worn. As shown, the telescoping side wall 16 naturally slides downwards in the direction of the brush axis 13 as the brush wears.

Figure 5:
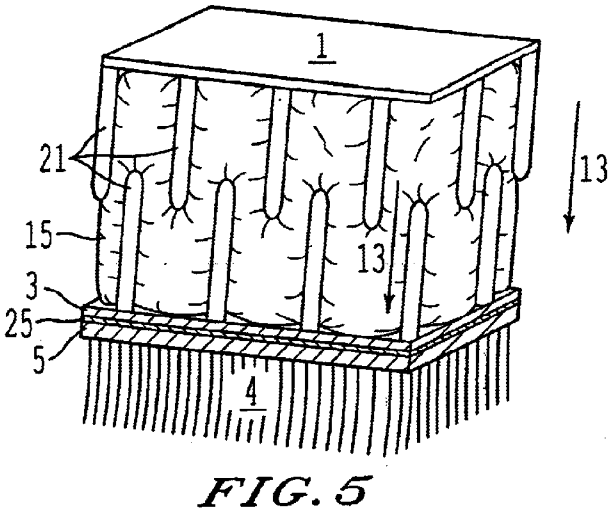
FIG. 5 is a perspective view of a brush holder in FIGS. 3A to 3D, but includes a set of rods for restraining the flexible side wall from lateral motions.

FIG. 5 illustrates another embodiment in which a flexible side wall 15 made of thin plastic or rubber/elastomer sheet may be contained via rods 21 supporting the flexible side wall 15. The flexible side wall 15 may be in addition to the flexible membranes 11 and 12 or may itself contain the compressed gas 10 and/or liquid metal 8. The flexible membrane 15 is supported by the rods 21, which are attached to the top wall 1 and bottom wall 3. Thus, with this configuration, erratic lateral brush movements may be prevented. The brush rods 21 are also in the brush axis direction 13 and may be made of TEFLON, for example, for ease of sliding during brush wear.

Figure 6A:
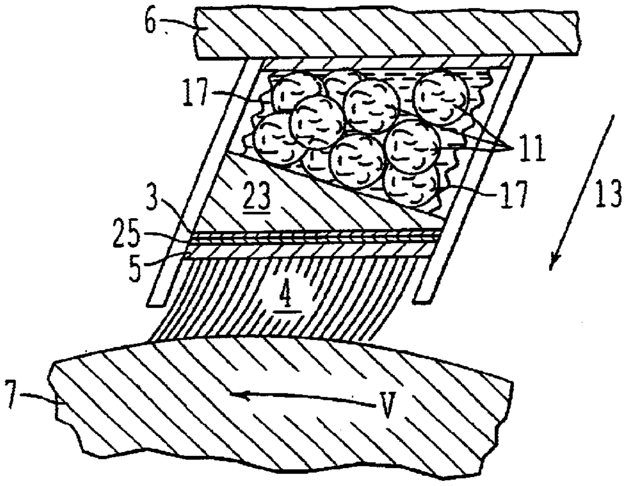
FIGS. 6A and 6B are cross-sectional views of brush holders including wedge-shaped first and second walls (i.e. at top and bottom, respectively) to facilitate orienting the brush relative to the substrate.
Figure 6B:
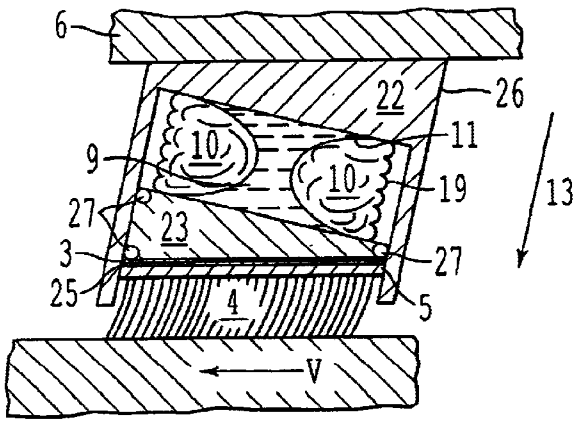

FIGS. 6A and 6B show the use of wedge-shaped first and second walls, singly or in combination, to angle the brush 4 relative to substrate 7 as desired. For example, as shown in FIG. 6A, a wedge-shape bottom plate 23 may be releasably attached to the brush 4 to angle the brush 4 relative to the substrate 7. FIG. 6A includes the flexible membrane 11 similar to that shown in FIG. 3A, but also includes a side wall 17 in the form of bellows to inhibit erratic lateral brush movements as discussed previously.

FIG. 6B is similar to FIG. 6A, but includes an additional wedge-shaped top wall 22. FIG. 6B also illustrates another possible configuration of the compressed gas 10, the flexible membrane 11 and the liquid metal 8. Further, the flexible membrane 11, gas 10 and liquid metal 8 may be contained via side walls 19 composed of spiral tubing and the rigid tubing 26 so as to apply pressure to the brush 4 in an axis direction thereof. Further, it is possible that a connection to an exterior gas pressure reservoir is also included in FIG. 6B (similar to that shown in FIG. 3D) to maintain a constant brush force. The guides 27 in FIG. 6A, just as the guides in FIG. 2B may be used to guide the wedge-shaped bottom plate 23 between the rigid tubing 26 so that the brush is pressed towards the substrate 7 in a longitudinal axis direction and to inhibit erratic lateral brush movements.

Figure 7A:
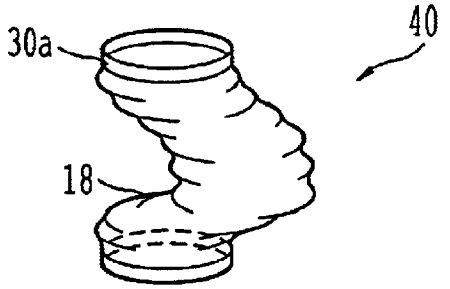
FIGS. 7A to 7C are perspective views of liquid metal cables made of flexible and extendable tubing filled with liquid metal and fitted with different electrical connectors.
Figure 7B:
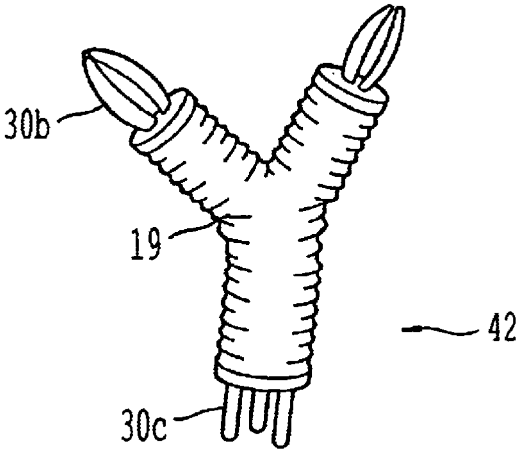
Figure 7C:
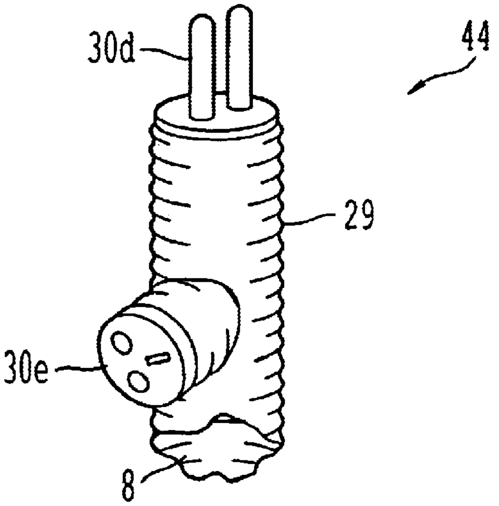

FIGS. 7A–7C are perspective views of liquid metal cables made of flexible and extendable tubing filled with liquid metal and fitted with different electrical connectors. For example, FIG. 7A illustrates a liquid metal cable 40 having a sidewall 18 composed of flexible tubing capped off with an electrical connector 30A. The electrical connector 30A may be a simple metal terminal which can be welded or soldered, for example, to another object (e.g., electrical device). Thus, the liquid metal cable 40 may be used to connect the first wall 1 to the second wall 3 in brush holders. This feature is discussed in more detail with reference FIGS. 8A–8C. FIG. 7B illustrates a liquid metal cable 42 having a side wall 19 composed of spiral tubing and having electrical connectors 30B and 30C. The electrical connectors 30B and 30C may be conventional "plug" electrical connectors. FIG. 7C is another embodiment of a liquid metal cable 44 which includes a flexible tubing 29 containing the liquid metal 8 and having electrical connectors 30D and 30E.

Figure 8A:
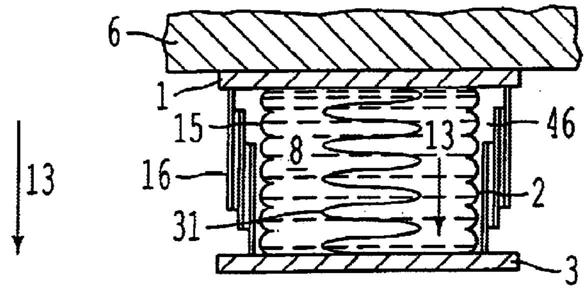
FIGS. 8A to 8C are cross-sectional views of different brush holders in which the current is conducted through what essentially are liquid metal cables and the brush force is supplied by mechanical springs.
Figure 8B:
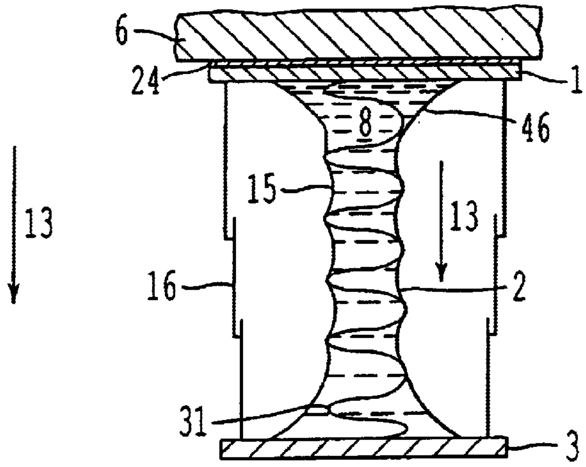
Figure 8C:
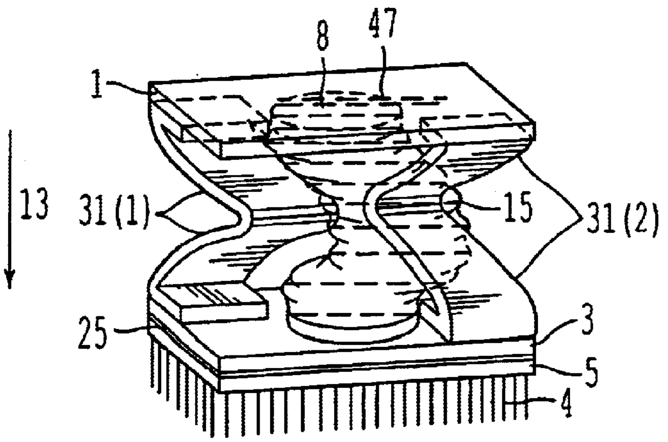

Turning now to FIGS. 8A–8C. FIGS. 8A–8C show different brush holders in which the current is conducted through liquid metal much as in liquid metal cables and the brush force is applied by mechanical springs. For example, in FIGS. 8A and 8B, that part of the brush holder (alternatively to be viewed as a liquid metal cable 46) is easily extendable by means of a highly extendable side wall 2 and contains a helical spring 31 which applies a mechanical force between the first wall 1 and second wall 3. The second plate with its releasably attached brush (not shown) is guided in the brush axis 13 direction by the telescoping side wall 16 while the spring 31 provides the brush force. In an initial state, the spring 31 is strongly compressed and the side wall 2 has a large average diameter (see FIG. 8A). At its fullest final extension, the side wall is held in place where it is fastened to the first wall 1 and second wall 3, but is mainly constrained by the helical spring 31 (See FIG. 8B).

FIG. 8C illustrates another example of combining the concept of liquid metal cables and mechanical springs for making electrical brush holders. As shown in FIG. 8C, the spring 31 provides the brush force and is of a leaf design and is wholly outside the liquid metal 8 contained within the side walls 15. Further, part of the brush holder that resembles a liquid metal cable 47, accommodates a distance increase between the first wall 1 and the second wall 3 in the course of brush wear not through elongation as in FIGS. 8A and 8B, but by straightening out from a bent position.

Figure 9A:
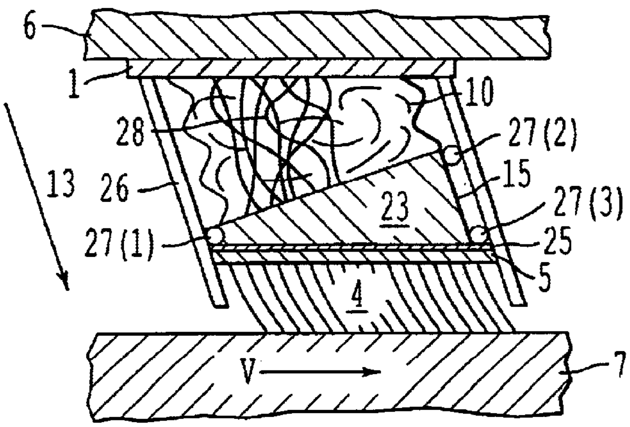
FIGS. 9A to 9C are cross-sectional views of brush holders in which the current is conducted through a highly flexible cable of metal fibers and the brush force is supplied by compressed gas.
Figure 9B:
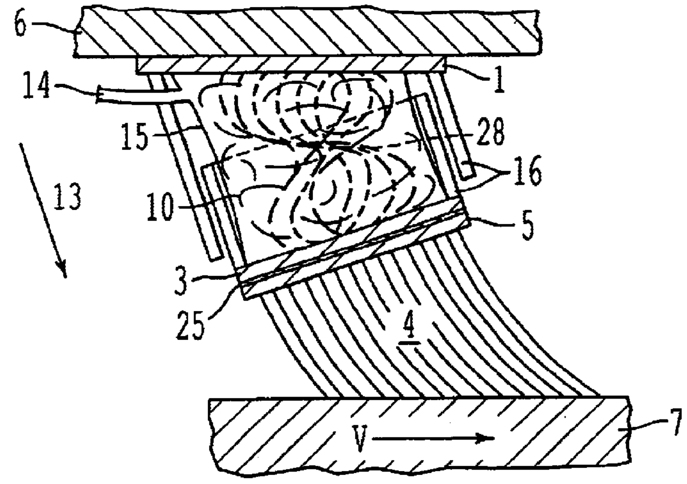

FIG. 9A shows a brush holder in which the pressurized fluid is a gas 10 that is entirely contained within an inner volume of the brush holder defined by the first plate 1, the second plate 3, and flexible side walls 15. A current between the top plate 1 and the brush 4 is conducted through a highly flexible cable 28 made of ultra-fine metal fibers within that same inner volume of the brush holder. Also shown are a rigid tube 26 and guides 27, to guide in axis direction 23, the wedge-shaped bottom plate 23 and thereby brush 4 as it wears. FIG. 9B is similar to 9A, but has a flat second wall 3. Further, FIG. 9B includes telescoping side wall 16 and flexible hose 14 to maintain a constant pressure of the gas 10. The flexible hose 14 may be connected to an exterior gas reservoir as previously discussed.

Figure 9C:
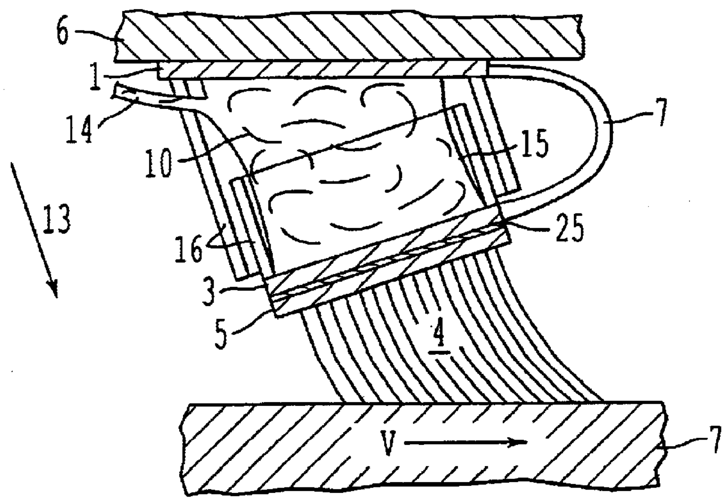

FIG. 9C is otherwise the same as FIG. 9B but the flexible cable 28 is outside of the inner volume of the brush holder defined by the first plate 1, the second plate 3 and the flexible side wall 15. Similarly, a flexible cable 28 may be used to establish a low-resistance current path between conducting element 6 and brush 4 for any embodiments of the invention. Flexible cable 28 may be similarly applied to any brush holder independent of construction.

LIST OF REFERENCES

[1] D. Kuhlmann-Wilsdorf, D. D. Makel and G. T. Gillies, "Continuous Metal Fiber Brushes", U.S. Patent Application, U.S. Ser. No. 60/014,753, filed Apr. 4, 1997,

[2] R. Holm. "Electrical Contacts—Theory and Applications" 4th edition (Springer Berlin/New York, 1967).

[3] S. Dillich and D. Kuhlmann-Wilsdorf, "Effects of Surface Films on the Performance of Silver-Graphite (75 w/o Ag, 25 w/o C) Electric Brushes" (Electrical Contacts—1979, Proc. Twenty-Fifth Holm Conference on Electrical Contacts, Ill. Inst. Techn., Chicago, Ill., 1979, pp. 185–190; see also IEEE Trans. on Components, Hybrids and Manufacturing Technology, CHMT-3, 1 (March 1980), pp. 37–41).

[4] P. B. Haney, D. Kuhlmann-Wilsdorf and H. G. F. Wilsdorf, "Production and Performance of Metal Foil Brushes", WEAR, 73 (1981), pp. 261–282

[5] D. Kuhlmann-Wilsdorf, "Uses of Theory in the Design of Sliding Electrical Contacts", ICEC-IEEE Holm 91 (37th. Holm Conference on Electrical Contacts, IEEE, Chicago, Oct. 6–9, 1991), pp. 1–24.

[6] D. Kuhlmann-Wilsdorf, "Electrical Fiber Brushes—Theory and Observations", ICEC-IEEE Holm 95 (41st. Holm Conference on Electrical Contacts, IEEE, Montreal, Canada, Oct. 2–4, 1995), pp. 295–314.

[7] D. Kuhlmann-Wilsdorf, "Metal Fiber Brushes" (Chapter 20, pages 943–1017, in "Electrical Contacts: Principles and Applications", Ed. P. G. Slade, Marcel Dekker, NY, 1999) pp. 943–1017.

What is claimed as new and desired to be secured by Letters Patent of the United States is:

1. An electrical brush holder for applying a mechanical force to an electrical fiber or foil brush and for establishing electrical contact between the electrical brush sliding against a substrate, and a current conducting element, comprising:

a first wall fastened to the current conducting element;

a second wall releasably fastened to the brush;

a sidewall lengthwise extendable in an axis direction of the brush and cooperating with the first and second walls to form a volume defined by the first wall, the second wall and the sidewall, the brush holder configured to apply an approximately constant pressure to the brush;

a flexible cable comprising of a plurality of ultra-fine metal fibers configured to conduct current between the current conducting element and the brush; and a fluidic medium contained in the volume, the fluidic medium comprising a liquid metal and a pressurized gas, the pressurized gas contained in a single flexible membrane surrounded by the liquid metal.

2. The electrical brush holder according to claim 1, wherein the gas and the liquid metal are in pressure-transmitting contact with each other via at least one flexible membrane.

3. The electrical brush holder according to claim 2, wherein said pressurized gas is pressurized from a source external to the volume.

4. The electrical brush holder according to claim 2, wherein said pressurized gas is entirely confined within the volume.

5. The electrical brush holder according to claim 1, wherein the flexible cable is at least partly located outside of the volume.

6. The electrical brush holder according to claim 5, wherein the flexible cable is completely located inside the volume.

7. The electrical brush holder according to claim 6, wherein said plurality of metal fibers comprise a diameter of less than 51 $\mu$m.

8. The electrical brush holder according to claim 6, wherein said plurality of metal fibers each have a diameter of less than 41 $\mu$m.

9. The electrical brush holder according to claim 6, wherein said plurality of metal fibers each have a diameter of less than 11 $\mu$m.

10. The electrical brush holder according to claim 6, wherein said electrical cable comprises a volume of the liquid metal confined in a flexible tubing.

11. The electrical brush holder according to claim 1, wherein the first wall is fastened to the current conducting element via at least one of a screw, a dove-tail, solder, cement, glue, a magnetic force, a suction force, and a bayonet closure.

12. The electrical brush holder according to claim 1, wherein at least part of the sidewall comprises at least one of spiral tubing, telescoping tubing, accordion pleated bellows, and flexible plastic sheet material.

13. An electrical brush holder for applying a mechanical force to an electrical fiber or foil brush and for establishing electrical contact between the electrical brush sliding against a substrate, and a current conducting element, comprising a first wall fastened to the current conducting element;

a second wall releasably fastened to the brush;

a sidewall lengthwise extendable in an axis direction of the brush and cooperating with the first and second walls to form a volume defined by the first wall, the second wall and the sidewall, the brush holder configured to apply an approximately constant pressure to the brush;

a flexible cable comprising of a plurality of ultra-fine metal fibers configured to conduct current between the current conducting element and the brush;

a fluidic medium contained in the volume, the fluidic medium comprising at least one of a liquid metal and a pressurized gas; and support rods configured to support at least part of the sidewall.

14. The electrical brush holder according to claim 1, wherein the second wall comprises a wedge-shape.

15. The electrical brush holder according to claim 1, wherein the first wall is angled relative to the sidewall.

16. The electrical brush holder according to claim 1, further comprising:

rigid tubing surrounding the sidewall and configured to guide the second wall in the axis direction of the brush.

17. The electrical brush holder according to claim 1, further comprising:

a spring disposed between said first and second walls and configured to apply a mechanical force to the brush.

18. The electrical brush holder according to claim 6, wherein the cable comprises electrical connectors configured to connect the cable to an electrical device.

19. The electrical brush holder according to claim 1, wherein the brush is releasably fastened to the second wall via at least one of a screw, a dove-tail, solder, cement, glue, a magnetic force, a suction force, and a bayonet closure.

20. An electrical brush holder for applying a mechanical force to an electrical fiber or foil brush and for establishing electrical contact between the electrical brush sliding against a substrate, and a current conducting element, comprising:

a first wall fastened to the current conducting element;

a second wall releasably fastened to the brush;

a sidewall lengthwise extendable in an axis direction of the brush and cooperating with the first and second walls to form a volume defined by the first wall, the second wall and the sidewall, the brush holder configured to apply an approximately constant pressure to the brush;

a flexible cable comprising of a plurality of ultra-fine metal fibers configured to conduct current between the current conducting element and the brush; and a fluidic medium contained in the volume, the fluidic medium comprising a liquid metal and a pressurized gas, the pressurized gas contained in a plurality of flexible membranes surrounded by the liquid metal.

21. An electrical brush holder for applying a mechanical force to an electrical fiber or foil brush and for establishing electrical contact between the electrical brush sliding against a substrate, and a current conducting element, comprising:

a first wall fastened to the current conducting element;

a second wall releasably fastened to the brush;

a sidewall lengthwise extendable in an axis direction of the brush and cooperating with the first and second walls to form a volume defined by the first wall, the second wall and the sidewall, the brush holder configured to apply an approximately constant pressure to the brush;

a flexible cable comprising of a plurality of ultra-fine metal fibers configured to conduct current between the current conducting element and the brush; and a fluidic medium contained in the volume, the fluidic medium comprising a liquid metal and a pressurized gas, the pressurized gas contained in a donut-shaped flexible membrane surrounded by the liquid metal.

22. The electrical brush holder according to claim 1, further comprising:

at least a third wall fastened to at least another brush.

* * * * *